US012670125B2

(12) United States Patent
Thompson et al.

(10) Patent No.: US 12,670,125 B2
(45) Date of Patent: Jun. 30, 2026

(54) MAINTAINING METADATA CONSISTENCY OF A MOUNTED FILE SYSTEM DURING RUNTIME

(71) Applicant: International Business Machines Corporation, Armonk, NY (US)

(72) Inventors: Robert Thompson, Austin, TX (US); Kenneth Anderson, Leander, TX (US); Yanhua Yang, Williamson, TX (US); Rama Mothey Tenjarla, Austin, TX (US); Roy Glenn Spencer, Williamson, TX (US)

(73) Assignee: International Business Machines Corporation, Armonk, NY (US)

( * ) Notice: Subject to any disclaimer, the term of this patent is extended or adjusted under 35 U.S.C. 154(b) by 1340 days.

(21) Appl. No.: 16/531,444

(22) Filed: Aug. 5, 2019

(65) Prior Publication Data

US 2021/0042268 A1      Feb. 11, 2021

(51) Int. Cl.
*G06F 16/17*          (2019.01)
*G06F 16/11*          (2019.01)

(52) U.S. Cl.
CPC ........ *G06F 16/1734* (2019.01); *G06F 16/122* (2019.01)

(58) Field of Classification Search
CPC ........................... G06F 16/1734; G06F 16/122
See application file for complete search history.

(56) References Cited

U.S. PATENT DOCUMENTS

| | | | |
|---|---|---|---|
| 7,418,465 B1 * | 8/2008 | Lewis ................... | G06F 3/0601 |
| 7,730,090 B2 | 6/2010 | Godbole | |
| 7,783,611 B1 * | 8/2010 | Hamilton ............ | G06F 16/1865 |
| | | | 707/696 |
| 7,890,469 B1 | 2/2011 | Maionchi et al. | |
| 8,301,673 B2 | 10/2012 | Hyer et al. | |
| 8,577,855 B2 | 11/2013 | Shyam et al. | |

(Continued)

FOREIGN PATENT DOCUMENTS

WO      WO-2010050944 A1 *   5/2010   .......... G06F 11/0727

OTHER PUBLICATIONS

Ma et al., "ffsck: The Fast File System Checker", 11th USENIX Conference on File and Storage Technologies (FAST '13), 15 pages.

(Continued)

*Primary Examiner* — Brittany N Allen

(74) *Attorney, Agent, or Firm* — Aaron N. Pontikos

(57)          ABSTRACT

Within metadata of a mounted file system with a file system transaction logging capability, a set of inodes is identified, each inode in the set of inodes comprising a data structure identifying a file system storage location of a portion of a file stored in the file system. A set of unused inodes is excluded from the set of inodes. A set of changing inodes is excluded from the set of inodes, each inode in the set of changing inodes comprising a flag indicating an in-progress write operation. A consistency check is performed on the metadata of the file system excluding the set of unused inodes and the set of changing inodes, the consistency check attempting to identify an inconsistency in the metadata. Responsive to the consistency check identifying an inconsistency in the metadata, the file system is remediated.

17 Claims, 9 Drawing Sheets

(56) References Cited

U.S. PATENT DOCUMENTS

|  |  |  |  |  |
|---|---|---|---|---|
| 8,843,533 | B1* | 9/2014 | Sukumar | G06F 16/14 |
|  |  |  |  | 707/822 |
| 8,880,476 | B2 | 11/2014 | Noronha et al. | |
| 9,069,682 | B1 | 6/2015 | Veeraswamy | |
| 9,146,921 | B1* | 9/2015 | Vempati | G06F 12/0292 |
| 9,223,788 | B2* | 12/2015 | Ranade | G06F 11/0751 |
| 10,528,429 | B1* | 1/2020 | Vempati | G06F 3/0631 |
| 10,678,650 | B1* | 6/2020 | Tummala | G06F 16/2365 |
| 10,705,918 | B1* | 7/2020 | Hu | G06F 16/215 |
| 11,200,206 | B2 | 12/2021 | Thompson et al. | |
| 2005/0097141 | A1 | 5/2005 | Loafman et al. | |
| 2006/0282471 | A1* | 12/2006 | Mark | G06F 11/08 |
| 2008/0222078 | A1* | 9/2008 | Godbole | G06F 16/10 |
| 2012/0150926 | A1* | 6/2012 | Adkins | G06F 16/18 |
|  |  |  |  | 707/825 |
| 2013/0290263 | A1 | 10/2013 | Beaverson et al. | |
| 2017/0060702 | A1* | 3/2017 | Dave | G06F 11/2094 |
| 2017/0235641 | A1 | 8/2017 | Ancel et al. | |
| 2018/0018218 | A1* | 1/2018 | Rat | G06F 3/0631 |
| 2018/0373596 | A1* | 12/2018 | Bhowmik | G06F 11/0793 |
| 2019/0251064 | A1* | 8/2019 | Aron | G06F 16/182 |
| 2020/0319944 | A1* | 10/2020 | Bhat | G06F 3/061 |
| 2020/0334111 | A1* | 10/2020 | Potnis | G06F 16/128 |
| 2022/0138207 | A1* | 5/2022 | Yelheri | G06F 16/289 |
|  |  |  |  | 707/722 |

OTHER PUBLICATIONS

Meshram et al., "Maintaining consistency of File system by Monitoring file system parameters at Runtime using Consistency Checking Rules", 4th International Conference on Reliability, Infocom Technologies and Optimization (ICRITO)(Trends and Future Directions), pp. 1-5, IEEE, 2015.

Mckusick, Running "fsck" in the Background, BSDCon 2002, pp. 55-64. https://www.usenix.org/legacy/events/bsdcon/mckusick/mckusick_html/.

List of all IBM related dockets. Appendix P. 2019.

* cited by examiner

Figure 3:
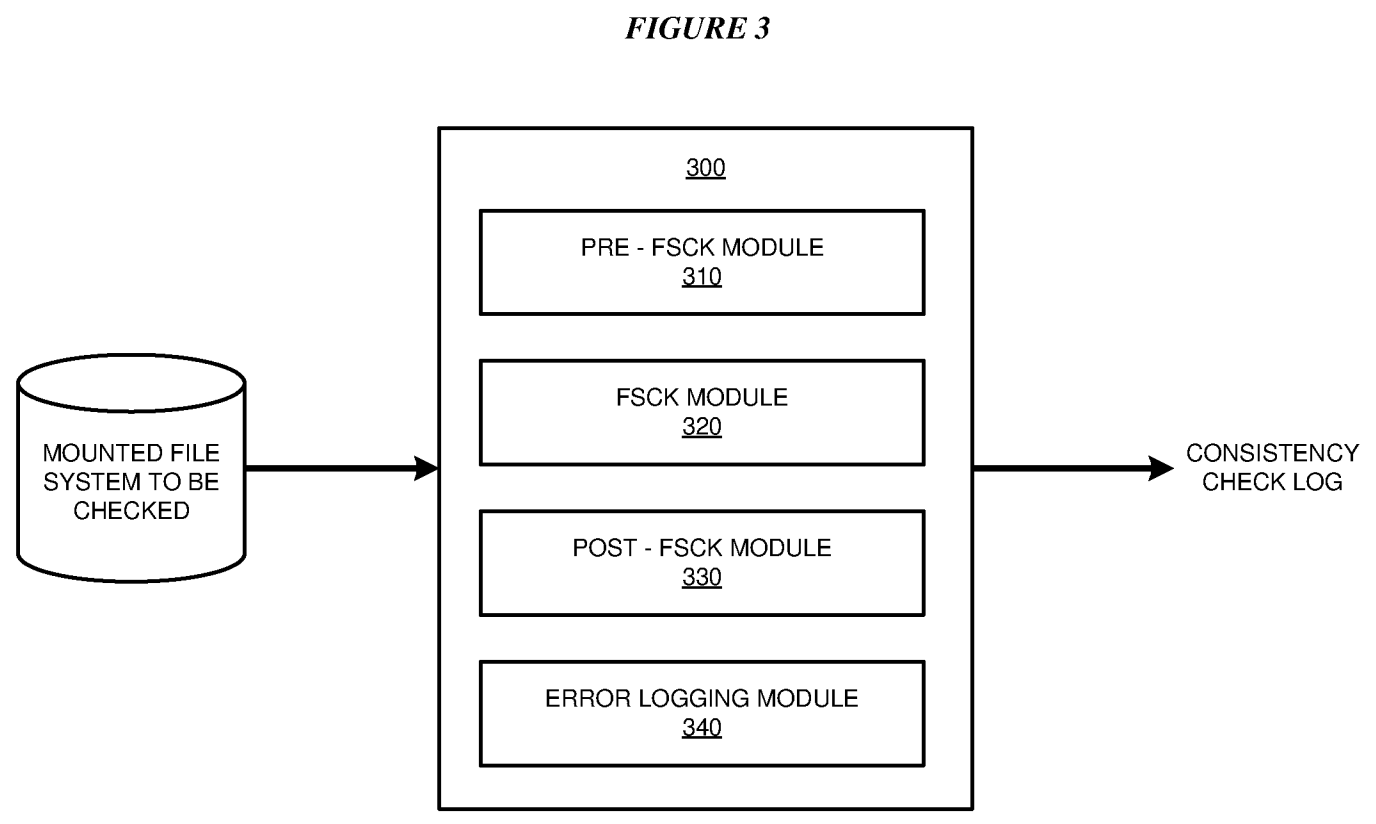

PRE - FSCK MODULE
310

FSCK MODULE
320

POST - FSCK MODULE
330

ERROR LOGGING MODULE
340

CONSISTENCY CHECK LOG

MOUNTED FILE SYSTEM TO BE CHECKED

Figure 8:
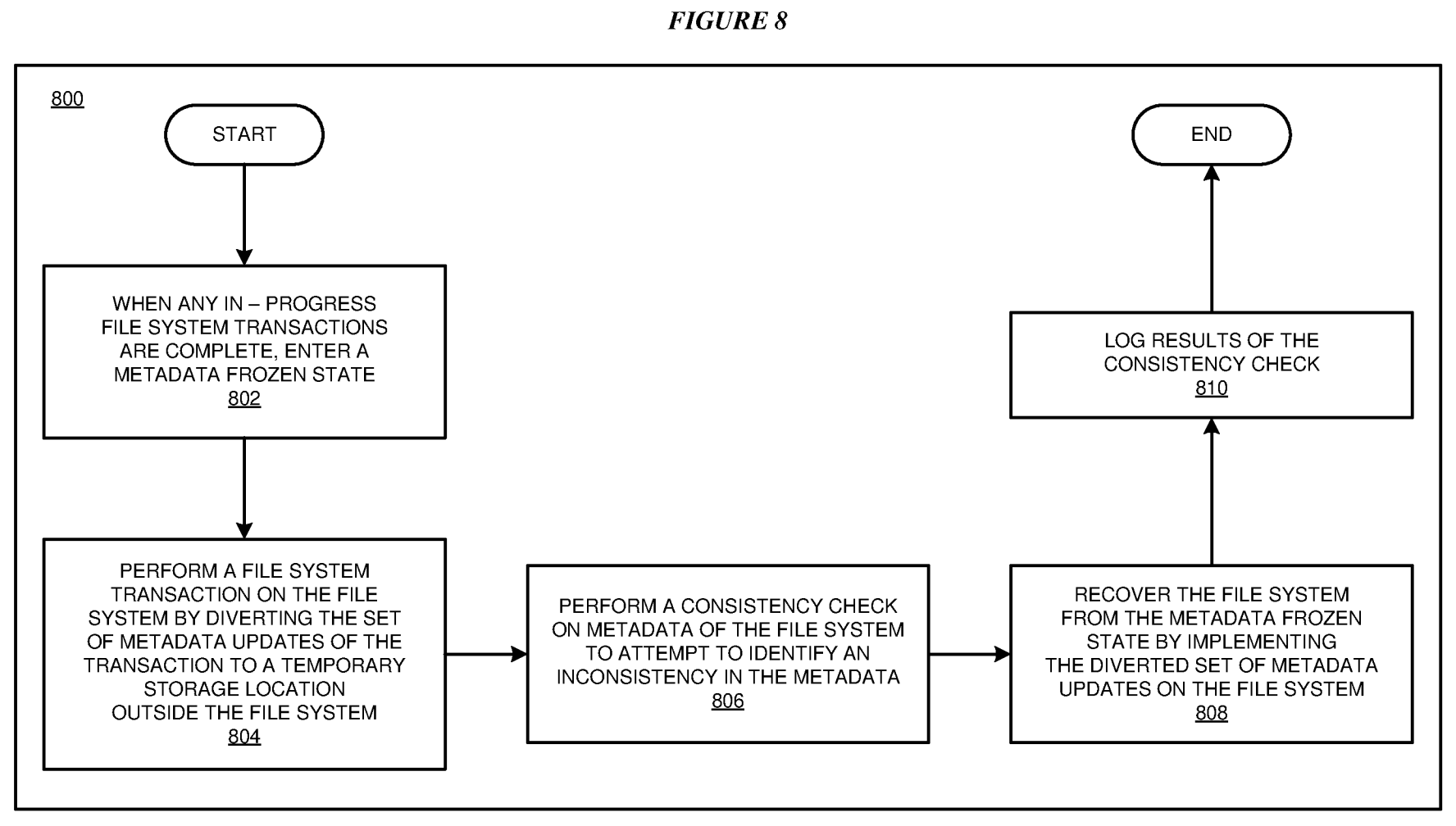

START

↓

WHEN ANY IN – PROGRESS
FILE SYSTEM TRANSACTIONS
ARE COMPLETE, ENTER A
METADATA FROZEN STATE
802

↓

PERFORM A FILE SYSTEM
TRANSACTION ON THE FILE
SYSTEM BY DIVERTING THE SET
OF METADATA UPDATES OF THE
TRANSACTION TO A TEMPORARY
STORAGE LOCATION
OUTSIDE THE FILE SYSTEM
804

↓

PERFORM A CONSISTENCY CHECK
ON METADATA OF THE FILE SYSTEM
TO ATTEMPT TO IDENTIFY AN
INCONSISTENCY IN THE METADATA
806

↓

RECOVER THE FILE SYSTEM
FROM THE METADATA FROZEN
STATE BY IMPLEMENTING
THE DIVERTED SET OF METADATA
UPDATES ON THE FILE SYSTEM
808

↓

LOG RESULTS OF THE
CONSISTENCY CHECK
810

↓

END

Figure 9:
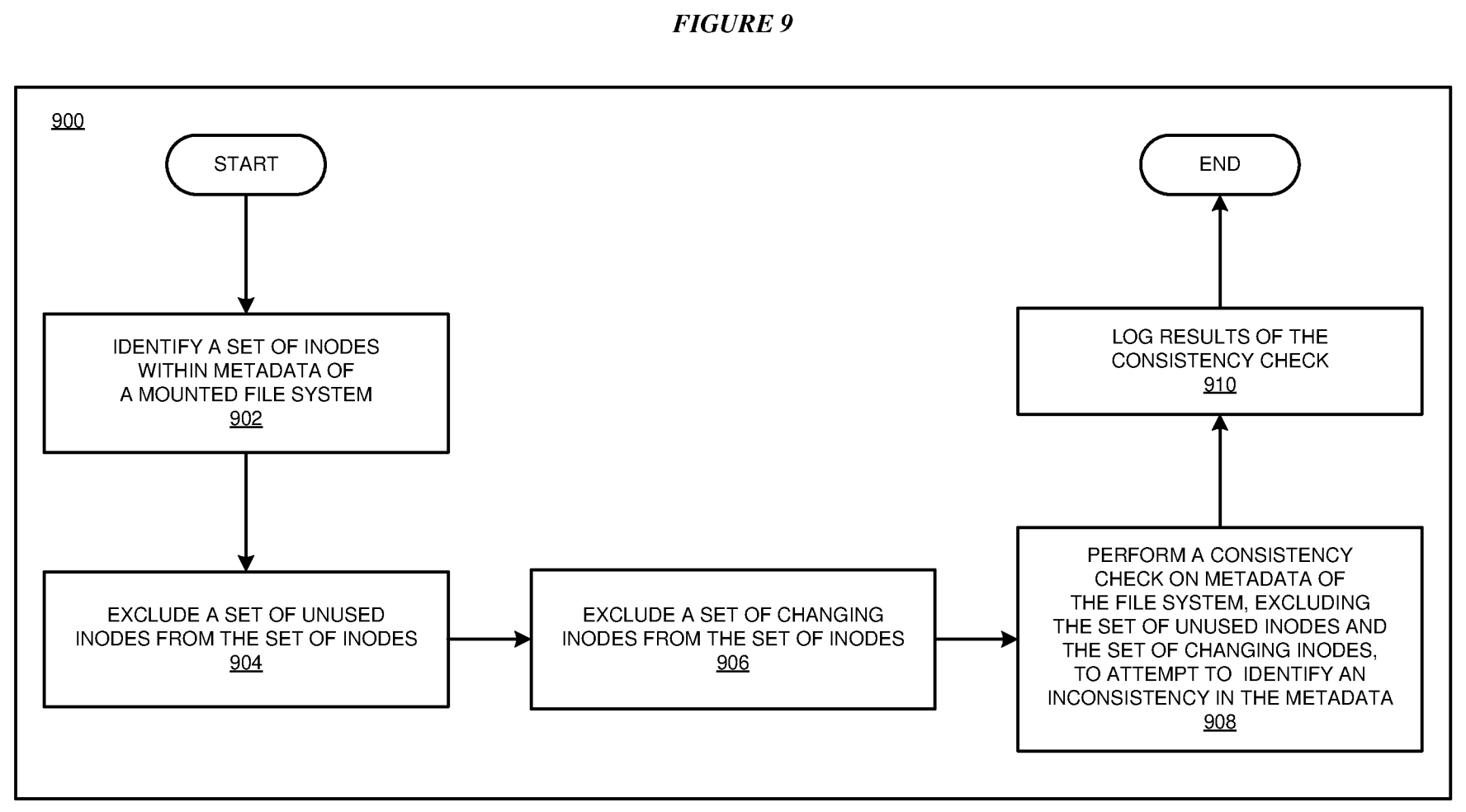

START

IDENTIFY A SET OF INODES WITHIN METADATA OF A MOUNTED FILE SYSTEM
902

EXCLUDE A SET OF UNUSED INODES FROM THE SET OF INODES
904

EXCLUDE A SET OF CHANGING INODES FROM THE SET OF INODES
906

PERFORM A CONSISTENCY CHECK ON METADATA OF THE FILE SYSTEM, EXCLUDING THE SET OF UNUSED INODES AND THE SET OF CHANGING INODES, TO ATTEMPT TO IDENTIFY AN INCONSISTENCY IN THE METADATA
908

LOG RESULTS OF THE CONSISTENCY CHECK
910

END

MAINTAINING METADATA CONSISTENCY OF A MOUNTED FILE SYSTEM DURING RUNTIME

TECHNICAL FIELD

The present invention relates generally to a method, system, and computer program product for file system maintenance. More particularly, the present invention relates to a method, system, and computer program product for maintaining metadata consistency of a mounted file system during runtime.

BACKGROUND

A file is a set of stored data identified by an identifier, usually referred to as a file name. Files are typically, but not necessarily, grouped into named directories or folders, often in a hierarchical tree structure descending from a top-level directory or folder. Each file is stored in one or more fixed-size blocks. User data refers to the named piece of information contained in a file.

A file system includes a set of files, metadata, directories, and other data structures necessary to read and write stored data. A file system both maintains user information, within files, and identifies where the user information is located on a storage device. The storage device may be a physical device, such as a hard drive or flash memory device. The storage device may also be a virtual device, such as an area of memory configured to function like a physical storage device.

In a file system, files are represented internally by index nodes, or inodes. An inode is a data structure that stores information about a file, for example one or more of access permission, timestamp, ownership, and data location information for each file. Pointers within the inode structure designate an address, within a storage device, of one or more data blocks that make up a file. Directories are also represented internally by inodes.

In addition to files and directories a file system contains a superblock, inode map, and allocation map. A superblock maintains information about the entire file system and typically includes information such as the size and number of data blocks in the file system and a flag indicating the state of the file system. In addition, a file system contains an inode map that records the location and allocation of all inodes in all or a specified portion of the file system, and an allocation map that records the allocation state (e.g. used or unused) of each file system block. Collectively, the inodes, filenames, directories, superblock, allocation maps, and any data of a file system other than the user data are termed the metadata of a file system. Thus, the metadata of a file system includes all the information necessary to access user data stored in the file system, but does not include the user data itself.

A transaction is an atomic file system event, in other words a file system event that is indivisible, in which metadata of a file system changes. Some non-limiting examples of transactions are creating a file, increasing the size of a file, and increasing the size of a file system. A transaction may include more than one metadata change, but the atomic nature of the transaction ensures that either multiple changes are successful, or, if one or more of the changes fail for any reason, none of the changes are made.

A logged file system logs metadata changes made during each transaction. Typically, disk blocks modified during a transaction are held in memory and written to a storage device only after the entire transaction is successfully written to the log, to avoid partially written transactions.

One significant responsibility of a file system is to ensure that, regardless of the actions by programs accessing the data, the metadata remains consistent. For example, if a program modifying data terminates abnormally or neglects to inform the file system that it has completed its activities, the file system may have to update the metadata and the directory entry and handle any data that was buffered but not yet updated on the physical storage media. A file system must also be able to recover from data structure inconsistencies caused by other failures, such as media failures, loss of connection to remote systems, an operating system failure, and a partial or complete power failure. If a file system cannot recover from metadata damage or inconsistency, user data stored in the file system could become inaccessible.

Because of the importance of maintaining metadata consistency, an operating system typically includes an application called a file consistency checker (FSCK). An FSCK checks, and attempts to repair, an inconsistent file system. For example, some of the inconsistencies an FSCK checks include blocks that are allocated to multiple files, inodes containing overlapping or out of range block numbers, and inodes containing block numbers that are marked as unused in the allocation map.

A mounted file system is accessible to other applications for file reads and writes. An unmounted or dismounted file system is not accessible for file reads and writes, but is accessible to an operating system process for configuring and maintaining the file system, for example to perform executables such as fsdb (a file system debugger) and dumpfs (to output all filesystem metadata). Executables performed on a mounted file system are also referred to as runtime tasks and applications.

SUMMARY

The illustrative embodiments provide a method, system, and computer program product. An embodiment includes a method that identifies, within metadata of a mounted file system with a file system transaction logging capability, a set of inodes, each inode in the set of inodes comprising a data structure identifying a file system storage location of a portion of a file stored in the file system. An embodiment excludes, from the set of inodes, a set of unused inodes. An embodiment excludes, from the set of inodes, a set of changing inodes, each inode in the set of changing inodes comprising a flag indicating an in-progress write operation. An embodiment performs, on the metadata of the file system excluding the set of unused inodes and the set of changing inodes, a consistency check, the consistency check attempting to identify an inconsistency in the metadata. An embodiment remediates, responsive to the consistency check identifying an inconsistency in the metadata, the file system.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 3 depicts a block diagram of an example configuration for maintaining metadata consistency of a mounted file system during runtime in accordance with an illustrative embodiment;

FIG. 4 depicts an example of maintaining metadata consistency of a mounted file system during runtime in accordance with an illustrative embodiment;

FIG. 8 depicts a flowchart of an example process for maintaining metadata consistency of a mounted file system during runtime in accordance with an illustrative embodiment; and FIG. 9 depicts a flowchart of an example process for maintaining metadata consistency of a mounted file system during runtime in accordance with an illustrative embodiment.

DETAILED DESCRIPTION

Figure 1:
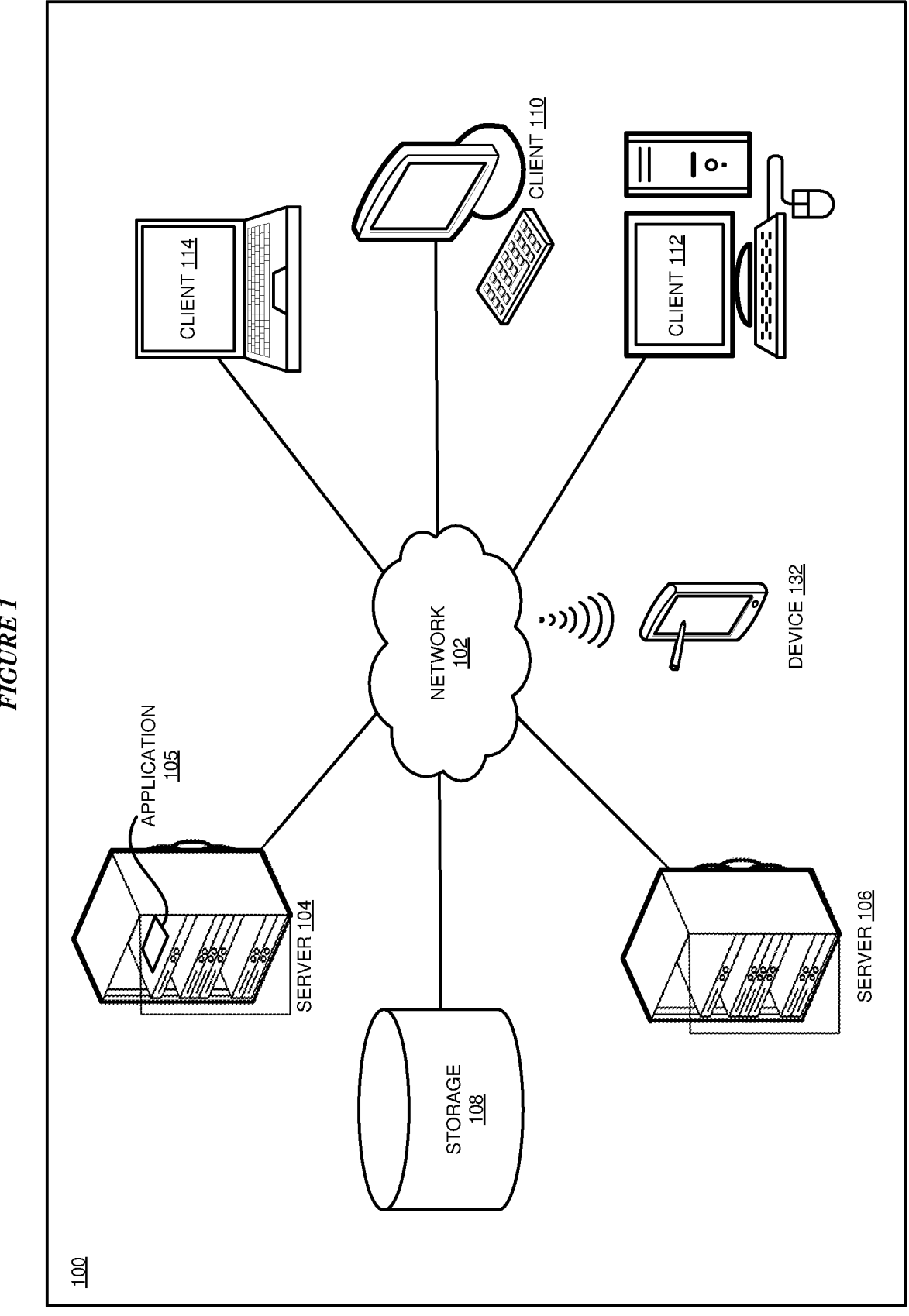
FIG. 1 depicts a block diagram of a network of data processing systems in which illustrative embodiments may be implemented.

The illustrative embodiments recognize that, because a mounted file system is available to process transactions, metadata of the file system are likely to change. Consequently, FSCK is typically run on an unmounted file system. If the FSCK reports no errors, an operating system proceeds to mount the file system for use by user applications. If the FSCK reports errors, the errors must be repaired or an attempt at user data recovery made before the file system can be mounted and used. Because an unmounted system is unavailable to process transactions, system administrators prefer to keep file systems mounted for long periods of time. As a result, correspondingly long periods of time can elapse between FSCK runs, allowing metadata inconsistencies to remain undetected. Undetected inconsistencies can cascade, complicating root cause analysis and potentially resulting in unrepairable data.

The illustrative embodiments also recognize that mounted file systems typically include reliability, availability, and serviceability (RAS) checks, performed on the attributes of each page of metadata as the page is read from a storage device to system memory for modification (for example, during a file write). However, a RAS check is only performed when a particular page of metadata is needed. If that particular page of metadata is accessed infrequently, metadata inconsistencies will remain undetected for correspondingly long periods of time, also complicating root cause analysis and potentially resulting in unrepairable data.

Consequently, the illustrative embodiments recognize that there is a need to perform FSCK on a mounted file system, without interfering with ongoing user transaction processing.

The illustrative embodiments recognize that the presently available tools or solutions do not address these needs or provide adequate solutions for these needs. The illustrative embodiments used to describe the invention generally address and solve the above-described problems and other problems related to maintaining metadata consistency of a mounted file system during runtime.

An embodiment can be implemented as a software application. The application implementing an embodiment can be configured as a modification of an existing file system consistency checking system, as a separate application that operates in conjunction with an existing file system consistency checking system, a standalone application, or some combination thereof.

Particularly, some illustrative embodiments provide a method of identifying a portion of the metadata of a mounted file system that are not currently changing due to ongoing user transactions, and performing metadata consistency checking on that portion.

An embodiment determines a suitable time interval at which to perform runtime FSCK. The time taken to run FSCK on an unmounted file system is approximately comparable to the time taken to run FSCK on a mounted file system. Runtime FSCK requires reading from a particular file system, which could degrade performance of user applications that require access to the same file system. However, a longer time interval between FSCK executions results in a longer time interval in which undetected metadata inconsistencies can accumulate, potentially causing additional problems. Thus, scheduling FSCK execution, and determining a time interval between successive FSCK executions, requires a tradeoff between catching errors quickly and avoiding undesirable performance impacts to user applications.

One embodiment prepares to place a mounted file system in a metadata frozen state by preparing a temporary metadata storage location. The temporary storage location must be large enough to hold metadata updates for transactions that are expected to occur during the metadata frozen state.

An embodiment waits for the completion of any current transactions, then places a mounted file system in a metadata frozen state. Waiting for current transactions to complete ensures that new inconsistencies are not created during frozen state entry.

An embodiment prepares to run FSCK by allocating sufficient inodes to accommodate transactions expected to occur while FSCK is running. One embodiment determines an amount of inodes to allocate by measuring the number of inodes created over a period of time (e.g., one minute) while the file system is in normal operation, determining a maximum or average time the FSCK is expected to take, and multiplying the two values. Pre-allocating inodes ensures that the inode map's size does not change while FSCK is running, simplifying the metadata consistency checking task.

While in the metadata frozen state, when a user transaction occurs, an embodiment logs the transaction, and stores user data on the storage device of the file system, as in the file system's normal operation. However, any metadata changes associated with the transaction are stored in the temporary metadata storage location instead of on the file system's storage device. In particular, the temporary metadata storage location stores data and a file system storage location for all metadata blocks written while in the frozen state.

Because metadata updates for user transactions are being diverted, the metadata of the file system does not change—i.e., the metadata is frozen. As a result, an embodiment can perform metadata consistency checking on the mounted file system in the frozen state without conflicting with the servicing of user transactions.

Once an embodiment consistency checked metadata of the mounted file system in the metadata frozen state, the embodiment recovers the file system from the frozen state. To recover the file system, one embodiment copies each metadata block from the temporary storage location to the appropriate location on the file system's storage device, then resumes servicing transactions by updating metadata on the file system's storage device, without further reference to the temporary storage location.

Another embodiment copies metadata blocks back to the file system's storage device on an as-needed basis, while servicing transactions. In particular, for each transaction a file system services while transitioning out of the frozen state, an embodiment checks whether metadata stored on the temporary storage device applies to the transaction the file system is currently processing. If so, and the transaction involves a metadata read, an embodiment reads the metadata from the temporary device. If the transaction involves a metadata write, an embodiment copies the metadata from the temporary storage device to the file system's storage device, then performs the transaction on the metadata on the file system's storage device. Alternatively, an embodiment performs the transaction on the metadata in the temporary storage, then copies the updated metadata to the file system's storage device. In this manner, eventually an embodiment migrates all metadata stored in the temporary storage back to file system's storage device. Once all metadata has been copied from the temporary storage, an embodiment can reuse the temporary storage to support consistency checking on another mounted file system.

Another embodiment does not utilize a metadata frozen state. Instead, this embodiment prepares to run a runtime FSCK on portions of a mounted file system that are not changing. In particular, the embodiment prepares to run FSCK by setting a flag indicating that a runtime FSCK is in progress. When a runtime FSCK is in progress, the embodiment prevents a mounted file system on which the runtime FSCK is being run from expanding or shrinking, because expanding or shrinking would require changing the file system allocation map. If a transaction attempts to expand or shrink the file system, an embodiment can be configured to terminate the runtime FSCK, then adjust the file system size. If a transaction attempts to expand or shrink the file system, an embodiment can also be configured to return an error message indicating that the attempt should be retried later, and continues with the runtime FSCK without changing the file system size. Preventing changes to the superblock and allocation map while FSCK is running further simplifies the metadata consistency checking task, without affecting file system transaction performance.

To perform metadata consistency checking on a mounted file system without using a metadata frozen state, an embodiment checks portions of the metadata that are not being changed by a current transaction. In particular, because the inode and allocation maps and the superblock have been configured to not change during FSCK, an embodiment performs consistency checks on the inode map, allocation map and the superblock. Although the global consistency of the allocation and inode maps cannot be checked during runtime as these maps are changing, an embodiment can check that fields within the maps have values within predetermined restrictions. If these fields have values outside the restrictions, the corresponding map may have been overwritten with corrupt data. If a page of the allocation and inode maps is not currently being accessed, an embodiment takes a read lock on a page to insure no changes can be made during consistency checking, performs internal page consistency checks, then releases the read lock In addition, an embodiment can consistency check control pages that advertise information on regular metadata pages by taking a concurrent read lock on both the control page and corresponding metadata page, performing the consistency check, then releasing the concurrent locks.

An embodiment also performs internal consistency checks on inodes that are currently being used in the file system but are not currently part of a write transaction that would modify the inodes, as well as any external metadata pages such an inode references. In addition, an embodiment performs internal consistency checks on inodes that are currently being used in the file system and are part of a write transaction, but whose size is not changing. An embodiment can consistency check the most important inode data, even during a write transaction that does not change the size of the inode. For example, an embodiment can check blocks used by each inode uses to ensure that no blocks are being used more than once within an inode. An embodiment also checks the consistency of directories with the data of each inode a directory claims to contain. An embodiment also creates its own allocation and inode maps based on blocks and inodes discovered during consistency checking, and checks these allocation and inode maps against the file system's stored allocation and inode maps. Although these allocation and inode maps may not be consistent with the file system's maps, an embodiment can still make comparisons to determine which part of a map is changing.

An embodiment reports, for example in a log, results of the runtime FSCK process, including any errors that were found. An embodiment can be configured to, optionally, stop the runtime FSCK process before completion, if a particular type of error, or an error of a particular level of seriousness, is found. An embodiment also attempts to isolate metadata inconsistencies to prevent creation of additional errors. For example, an embodiment can make a file or part of a file read-only, make the entire file system read-only, or cause a shutdown of an operating system using the file system.

The manner of maintaining metadata consistency of a mounted file system during runtime described herein is unavailable in the presently available methods in the technological field of endeavor pertaining to file system management. A method of an embodiment described herein, when implemented to execute on a device or data processing system, comprises substantial advancement of the functionality of that device or data processing system in performing a transaction while a mounted file system is in a metadata frozen state by diverting the metadata of the transaction to a temporary storage location, performing metadata consistency checks while the mounted file system is in the metadata frozen state, and recovering from the frozen state. Another method of an embodiment described herein, when implemented to execute on a device or data processing system, comprises substantial advancement of the functionality of that device or data processing system in identifying unused inodes and inodes that are not currently changing, excluding the unused and changing inodes from metadata to be consistency checked, and performing metadata consistency checks on the remaining metadata.

The illustrative embodiments are described with respect to certain types of file system data structures, metadata, inodes, allocations, maps, superblocks, transactions, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
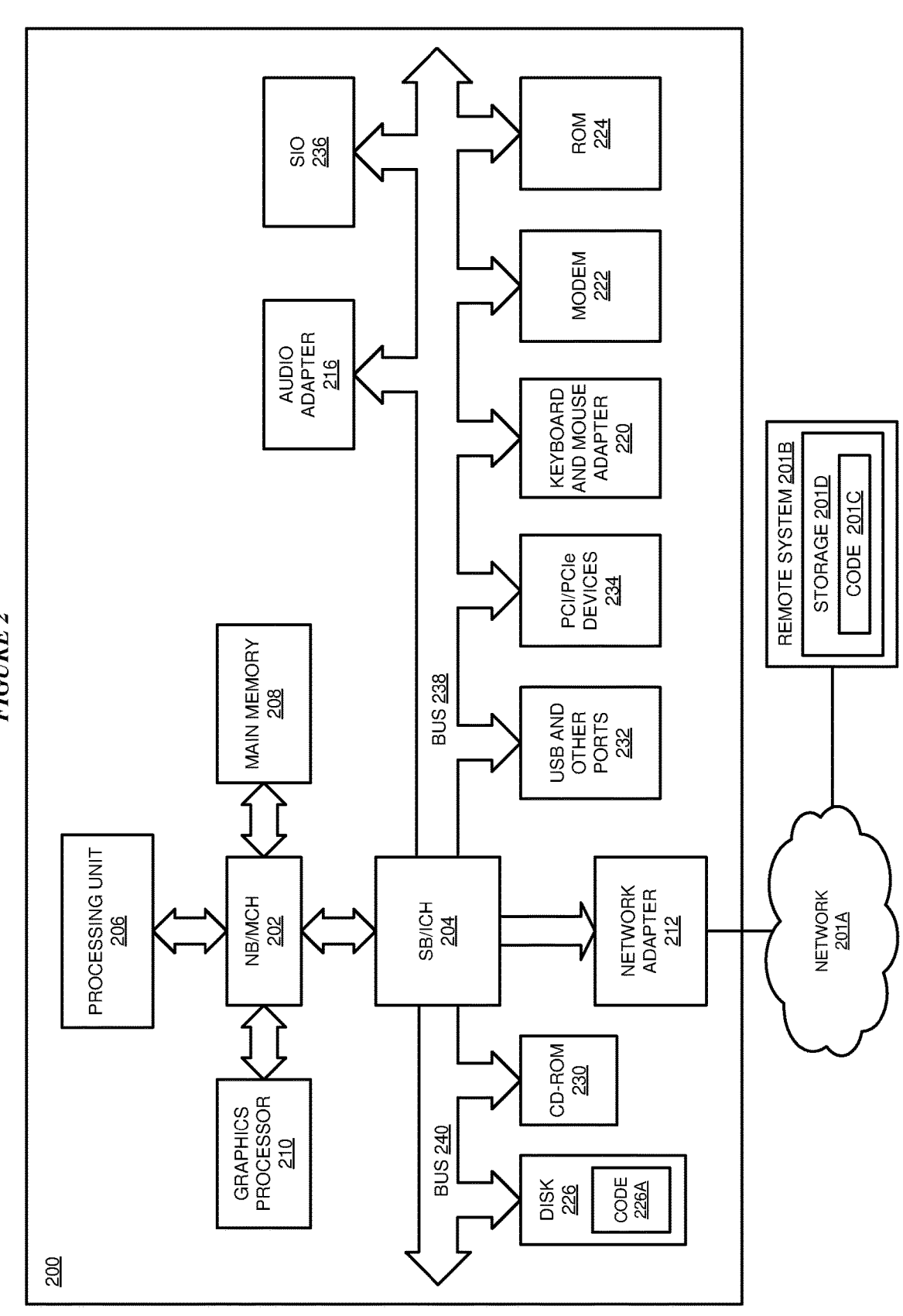
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 can execute in any of servers 104 and 106, clients 110, 112, and 114, and device 132 to perform metadata consistency checking on a mounted file system that is part of storage unit 108.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

With reference to FIG. 3, this figure depicts a block diagram of an example configuration for maintaining metadata consistency of a mounted file system during runtime in accordance with an illustrative embodiment. Application 300 is an example of application 105 in FIG. 1 and can execute in any of servers 104 and 106, clients 110, 112, and 114, and device 132 in FIG. 1.

In one implementation of application 300, pre-FSCK module 310 prepares to place a mounted file system in a metadata frozen state by preparing a temporary metadata storage location. The temporary storage location must be large enough to hold metadata updates for transactions that are expected to occur during the metadata frozen state. Module 310 waits for the completion of any current transactions, then places a mounted file system in a metadata frozen state. Waiting for current transactions to complete ensures that new inconsistencies are not created during frozen state entry.

While in the metadata frozen state, when a user transaction occurs, FSCK module 320 logs the transaction, and stores user data on the storage device of the file system, as in the file system's normal operation. However, any metadata changes associated with the transaction are stored in the temporary metadata storage location instead of on the file system's storage device. In particular, the temporary metadata storage location stores data and a file system storage location for all metadata blocks written while in the frozen state. Because metadata updates for user transactions are being diverted, the metadata of the file system does not change—i.e., the metadata is frozen. As a result, module 320 can perform metadata consistency checking on the mounted file system in the frozen state without conflicting with the servicing of user transactions.

Once module 320 has performed FSCK on the mounted file system in the metadata frozen state, post-FSCK module 330 recovers the file system from the frozen state. To recover the file system, one implementation of module 330 copies each metadata block from the temporary storage location to the appropriate location on the file system's storage device, then resumes servicing transactions by updating metadata on the file system's storage device, without further reference to the temporary storage location.

Another implementation of module 330 copies metadata blocks back to file system's storage device on an as-needed basis, while servicing transactions. In particular, for each transaction a file system services while transitioning out of the frozen state, module 330 checks whether metadata stored on the temporary storage device applies to the transaction the file system is currently processing. If so, and the transaction involves a metadata read, module 330 reads the metadata from the temporary device. If the transaction involves a metadata write, module 330 copies the metadata from the temporary storage device to the file system's storage device, then performs the transaction on the metadata on the file system's storage device. Alternatively, module 330 performs the transaction on the metadata in the temporary storage, then copies the updated metadata to the file system's storage device. In this manner, eventually module 330 migrates all metadata stored in the temporary storage back to file system's storage device. Once all metadata has been copied from the temporary storage, application 300 can reuse the temporary storage to support consistency checking on another mounted file system.

Another implementation of application 300 does not utilize a metadata frozen state. Instead, in this implementation pre-FSCK module 310 prepares to run a runtime FSCK on portions of a mounted file system that are not changing. In particular, module 310 prepares to run FSCK by allocating sufficient inodes to accommodate transactions expected to occur while FSCK is running.

Module 310 also prepares to run FSCK by setting a flag indicating that a runtime FSCK is in progress. When a runtime FSCK is in progress, application 300 prevents a mounted file system on which the runtime FSCK is being run from expanding or shrinking, because expanding or shrinking would require changing the file system allocation map. If a transaction attempts to expand or shrink the file system, application 300 can be configured to terminate the runtime FSCK, then adjust the file system size. If a transaction attempts to expand or shrink the file system, application 300 can also be configured to return an error message indicating that the attempt should be retried later, and continues with the runtime FSCK without changing the file system size. Preventing changes to the superblock and allocation map while FSCK is running further simplifies the metadata consistency checking task, without affecting file system transaction performance.

To perform metadata consistency checking on a mounted file system without using a metadata frozen state, FSCK module 320 checks portions of the metadata that are not being changed by a current transaction. In particular, because the inode and allocation maps and the superblock have been configured to not change during FSCK, module 320 performs consistency checks on the inode and allocation maps and the superblock. Module 320 also performs consistency checks on inodes that are currently being used in the file system but are not currently part of a write transaction that would modify the inodes. In addition, module 320 performs consistency checks on inodes that are currently being used in the file system and are part of a write transaction, but whose size is not changing. Module 320 can consistency check the most important inode data, even during a write transaction that does not change the size of the inode. Module 320 also checks the consistency of directories with the data of each inode a directory claims to contain. Module 320 also creates its own allocation and inode maps based on blocks and inodes discovered during consistency checking, and checks these allocation and inode maps against the file system's stored allocation and inode maps. Module 320 performs sufficient consistency checks, at runtime by checking portions of metadata only when not being used in a transaction, to detect significant errors before they cause additional problems.

In either implementation of application 300, error logging module 340 reports, for example in a log, results of the runtime FSCK process, including any errors that were found. found. Application 300 can be configured to, optionally, stop the runtime FSCK process before completion, if a particular type of error, or an error of a particular level of seriousness, is found. Module 340 also attempts to isolate metadata inconsistencies to prevent creation of additional errors. For example, module 340 can make a file or part of a file read-only, make the entire file system read-only, or cause a shutdown of an operating system using the file system.

Figure 4:
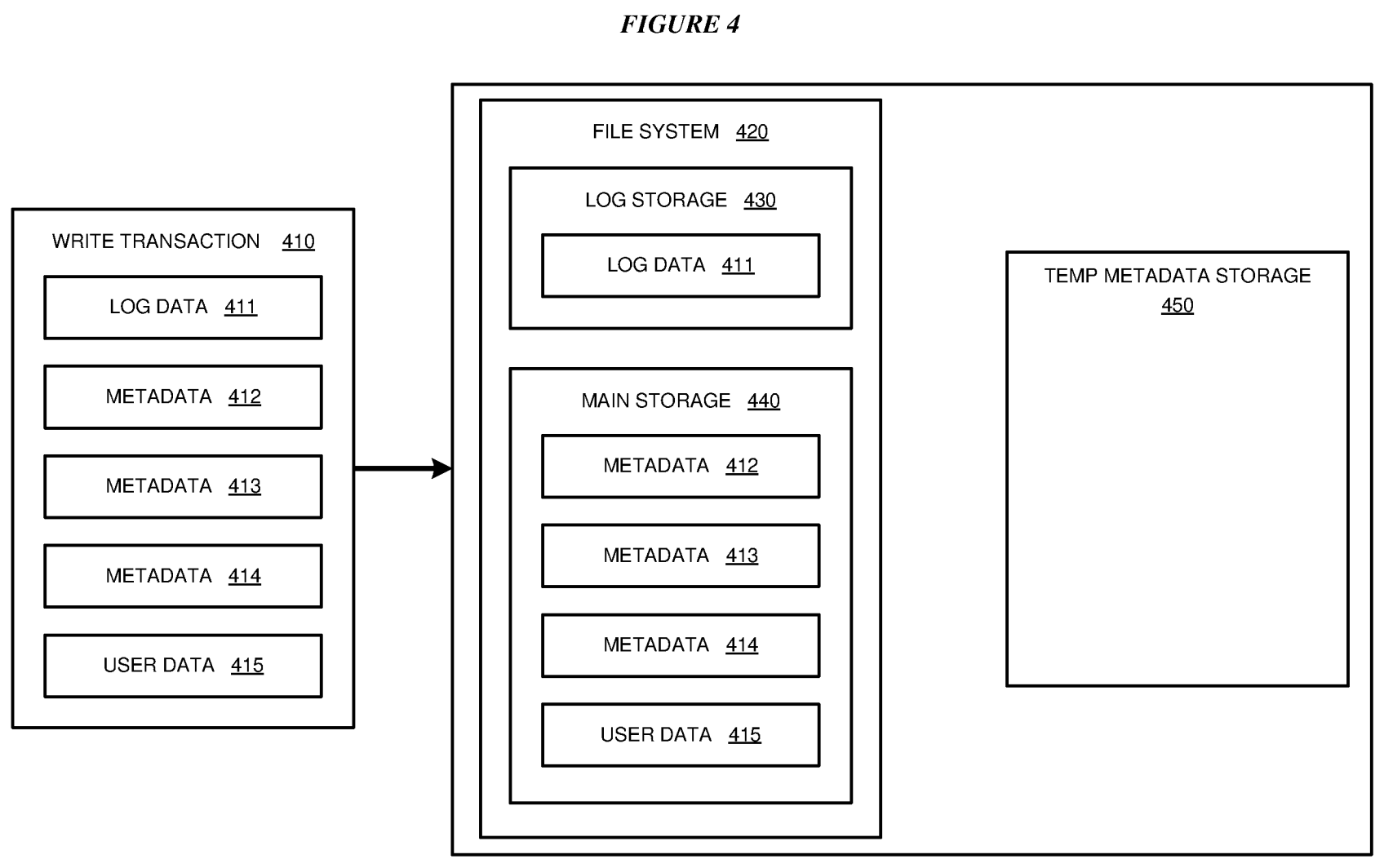

With reference to FIG. 4, this figure depicts an example of maintaining metadata consistency of a mounted file system during runtime in accordance with an illustrative embodiment. The example can be executed using application 300 in FIG. 3.

In particular, FIG. 4 depicts components of write transaction 410 being stored in mounted file system 420, during normal operation. Write transaction 410 includes log data 411, metadata 412, 413, and 414, and user data 415. Once write transaction 410 has completed, file system 420 stores log data 411 in log storage 430. File system 420 stores metadata 412, 413, and 414, and user data 415 in main storage 440. In addition, temporary metadata storage 450 is available for use, but is empty and not currently being used. Log storage 430 could also be located outside file system 420.

Figure 5:
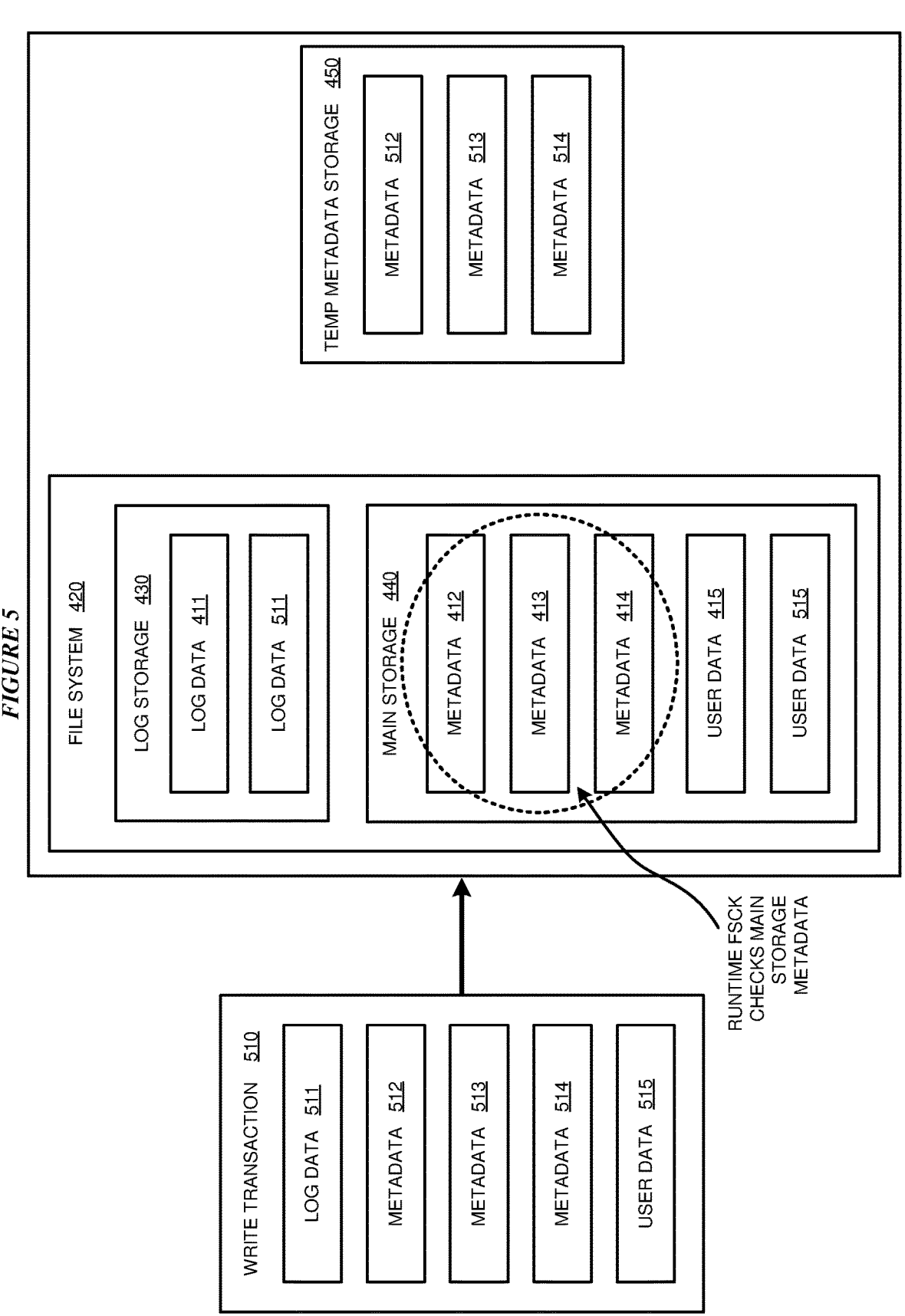
FIG. 5 depicts a continuation of an example of maintaining metadata consistency of a mounted file system during runtime in accordance with an illustrative embodiment.

With reference to FIG. 5, this figure depicts a continuation of an example of maintaining metadata consistency of a mounted file system during runtime in accordance with an illustrative embodiment. File system 420, log storage 430, log data 411, main storage 440, metadata 412, 413, and 414, user data 415, and temporary metadata storage 450 are the same as file system 420, log storage 430, log data 411, main storage 440, metadata 412, 413, and 414, user data 415, and temporary metadata storage 450 in FIG. 4. The example can be executed using application 300 in FIG. 3.

In particular, FIG. 5 depicts components of write transaction 510 being stored while file system 420 is in the metadata frozen state. Write transaction 510 includes log data 511, metadata 512, 513, and 514, and user data 515. As in normal operation, log data 511 is stored in log storage 430. Also as in normal operation, user data 515 is stored in main storage 440. However, because file system 420 is in the metadata frozen state metadata 512, 513, and 514 are stored in temporary metadata storage 450 instead of main storage 440. In addition, application 300 is performing metadata consistency checking on metadata in main storage 440, including metadata 412, 413, and 414, without interfering with processing of write transaction 510.

Figure 6:
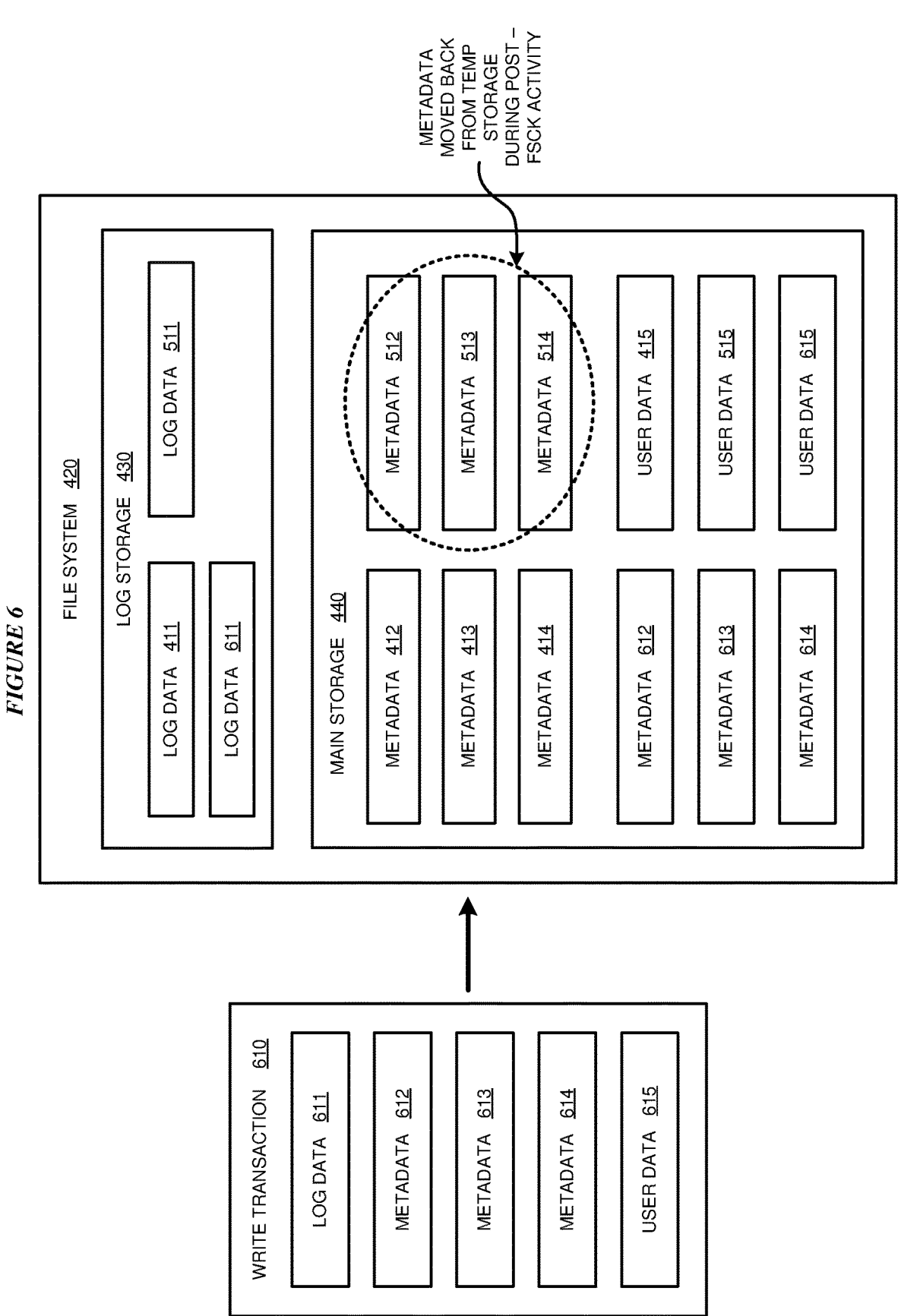
FIG. 6 depicts a continuation of an example of maintaining metadata consistency of a mounted file system during runtime in accordance with an illustrative embodiment.

With reference to FIG. 6, this figure depicts a continuation of an example of maintaining metadata consistency of a mounted file system during runtime in accordance with an illustrative embodiment. File system 420, log storage 430, log data 411 and 511, main storage 440, metadata 412, 413, 414, 512, 513, and 514, user data 415 and 515, and temporary metadata storage 450 are the same as file system 420, log storage 430, log data 411 and 511, main storage 440, metadata 412, 413, 414, 512, 513, and 514, user data 415 and 515, and temporary metadata storage 450 in FIG. 5. The example can be executed using application 300 in FIG. 3.

In particular, FIG. 6 depicts components of write transaction 610 being stored after file system 420 has transitioned out of the metadata frozen state. Write transaction 610 includes log data 611, metadata 612, 613, and 614, and user data 615. Log data 611 is stored in log storage 430 and user data 615 is stored in main storage 440. Metadata 412, 413, and 414, now consistency checked and determined to be correct, remain in main storage 440. In addition, because main storage 440 has transitioned out of the metadata frozen state, metadata 512, 513, and 514 have been moved from temporary metadata storage 450 (not shown) to main storage 440.

Figure 7:
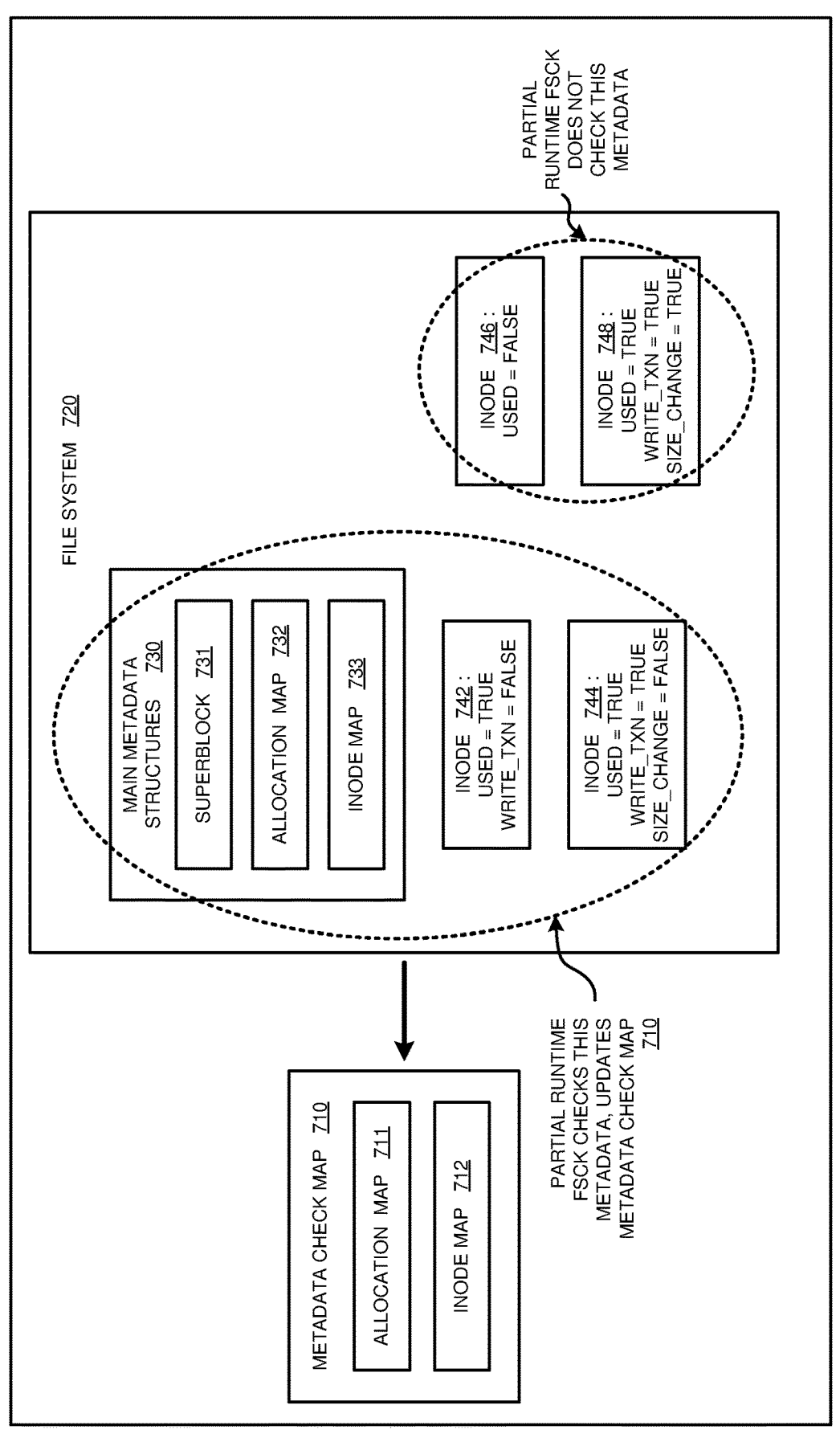
FIG. 7 depicts an example of maintaining metadata consistency of a mounted file system during runtime in accordance with an illustrative embodiment.

With reference to FIG. 7, this figure depicts an example of maintaining metadata consistency of a mounted file system during runtime in accordance with an illustrative embodiment. The example can be executed using application 300 in FIG. 3.

In particular, FIG. 7 depicts application 300's performance of partial runtime metadata consistency checking on file system 720, without using a metadata frozen state. File system 720 includes main metadata structures 730, which includes superblock 731, allocation map 732, and inode map 733. File system 720 also includes inodes 742, 744, 746, and 748. Inode 742 is being used, but is not currently performing a write transaction. Inode 744 is being used, and is currently performing a write transaction, but the size of inode 744 is not changing. As a result, application 300 can consistency check main metadata structures 730 and inodes 742 and 744. However, inode 746 is not being used, so is not checked by application 300. Inode 748 is being used, is currently performing a write transaction, and the size of inode 744 is changing. As a result, application 300 does not check application 300. During checking, application 300 tracks checked metadata in metadata check map 710, which includes allocation map 711 and inode map 712.

With reference to FIG. 8, this figure depicts a flowchart of an example process for maintaining metadata consistency of a mounted file system during runtime in accordance with an illustrative embodiment. Process 800 can be implemented in application 300 in FIG. 3.

In block 802, the application waits for any in-progress file system transactions to complete, then enters a metadata frozen state. In block 804, the application performs a file system transaction on the file system by diverting the set of metadata updates of the transaction to a temporary storage location outside the file system. In block 806, the application performs a consistency check on metadata of the file system to attempt to identify an inconsistency in the metadata. In block 808, the application recovers the file system from the metadata frozen state by implementing the diverted set of metadata updates on the file system. In block 810, the application logs results of the consistency check. Then the application ends.

With reference to FIG. 9, this figure depicts a flowchart of an example process for maintaining metadata consistency of a mounted file system during runtime in accordance with an illustrative embodiment. Process 900 can be implemented in application 300 in FIG. 3.

In block 902, the application identifies a set of inodes within metadata of a mounted file system. In block 904, the application excludes a set of unused inodes from the set of inodes. In block 906, the application excludes a set of changing inodes from the set of inodes. In block 908, the application performs a consistency check on metadata of the file system, excluding the set of unused inodes and the set of changing inodes, to attempt to identify an inconsistency in the metadata. In block 910, the application logs results of the consistency check. Then the application ends.

Thus, a computer implemented method, system or apparatus, and computer program product are provided in the illustrative embodiments for maintaining metadata consistency of a mounted file system during runtime and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
performing a consistency check on a plurality of inodes of a mounted portion of a file system, the consistency check performed while the plurality of inodes is accessible for use in a file read operation and while the plurality of inodes is not participating in an in-progress write operation, the consistency check attempting to identify an inconsistency in data stored in the plurality of inodes, each inode in the plurality of inodes comprising a data structure identifying a file system storage location of a portion of a file stored in the file system; and
remediating, responsive to the consistency check identifying an inconsistency in the data stored in the plurality of inodes, the file system.

2. The computer-implemented method of claim 1, wherein the consistency check includes a consistency check of an inode map of the file system, the inode map recording a status of the plurality of inodes.

3. The computer-implemented method of claim 1, wherein the consistency check includes a consistency check of an allocation map of the file system, the allocation map recording a status of a set of blocks used to store data in the file system.

4. The computer-implemented method of claim 1, wherein the consistency check includes a consistency check of a superblock of the file system, the superblock maintaining information about the file system.

5. The computer-implemented method of claim 1, further comprising logging results of the consistency check.

6. The computer-implemented method of claim 1, further comprising marking, responsive to the consistency check determining that third metadata associated with a portion of a file stored in the file system has a consistency error, the portion as read-only, the marking preventing modification of the portion.

7. The computer-implemented method of claim 1, further comprising marking, responsive to the consistency check determining that fourth metadata of the file system has a consistency error, the file system as read-only, the marking preventing modification of files stored in the file system.

8. A computer usable program product comprising one or more computer-readable storage devices, and program instructions stored on at least one of the one or more storage devices, the stored program instructions comprising:
program instructions to perform a consistency check on a plurality of inodes of a mounted portion of a file system, the consistency check performed while the plurality of inodes is accessible for use in a file read operation and while the plurality of inodes is not participating in an in-progress write operation, the consistency check attempting to identify an inconsistency in data stored in the plurality of inodes, each inode in the plurality of inodes comprising a data structure identifying a file system storage location of a portion of a file stored in the file system; and
program instructions to remediate, responsive to the consistency check identifying an inconsistency in the data stored in the plurality of inodes, the file system.

9. The computer usable program product of claim 8, wherein the consistency check includes a consistency check of an inode map of the file system, the inode map recording a status of the plurality of inodes.

10. The computer usable program product of claim 8, wherein the consistency check includes a consistency check of an allocation map of the file system, the allocation map recording a status of a set of blocks used to store data in the file system.

11. The computer usable program product of claim 8, wherein the consistency check includes a consistency check of a superblock of the file system, the superblock maintaining information about the file system.

12. The computer usable program product of claim 8, further comprising program instructions to log results of the consistency check.

13. The computer usable program product of claim 8, further comprising program instructions to mark, responsive to the consistency check determining that third metadata associated with a portion of a file stored in the file system has a consistency error, the portion as read-only, the marking preventing modification of the portion.

14. The computer usable program product of claim 8, further comprising program instructions to mark, responsive to the consistency check determining that fourth metadata of the file system has a consistency error, the file system as read-only, the marking preventing modification of files stored in the file system.

15. The computer usable program product of claim 8, wherein the stored program instructions are stored in a computer readable storage device in a data processing system, and wherein stored program instructions are transferred over a network from a remote data processing system.

16. The computer usable program product of claim 8, wherein the stored program instructions are stored in a computer readable storage device in a server data processing system, and wherein the stored program instructions are downloaded over a network to a remote data processing system for use in a computer readable storage device associated with the remote data processing system.

17. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to perform a consistency check on a plurality of inodes of a mounted portion of a file system, the consistency check performed while the plurality of inodes is accessible for use in a file read operation and while the plurality of inodes is not participating in an in-progress write operation, the consistency check attempting to identify an inconsistency in data stored in the plurality of inodes, each inode in the plurality of inodes comprising a data structure identifying a file system storage location of a portion of a file stored in the file system; and program instructions to remediate, responsive to the consistency check identifying an inconsistency in the data stored in the plurality of inodes, the file system.

* * * * *